May 14, 1940.   C. L. MITCHEL ET AL   2,200,513
PROCESS OF CHURNING AND WORKING BUTTER
Original Filed Oct. 24, 1934   2 Sheets-Sheet 1
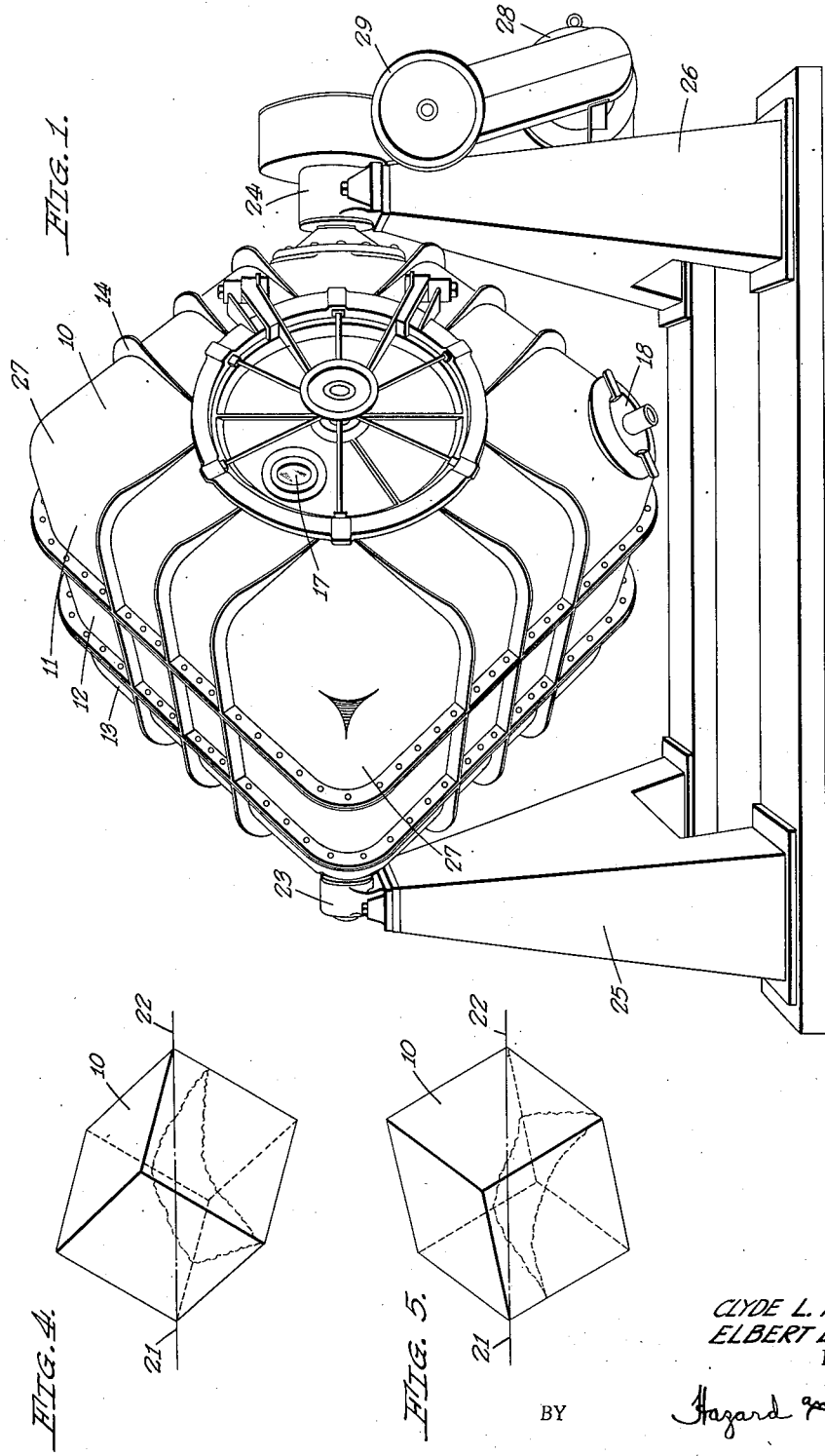
CLYDE L. MITCHEL
ELBERT L. WETMORE
INVENTORS
BY Hazard and Miller
ATTORNEYS.

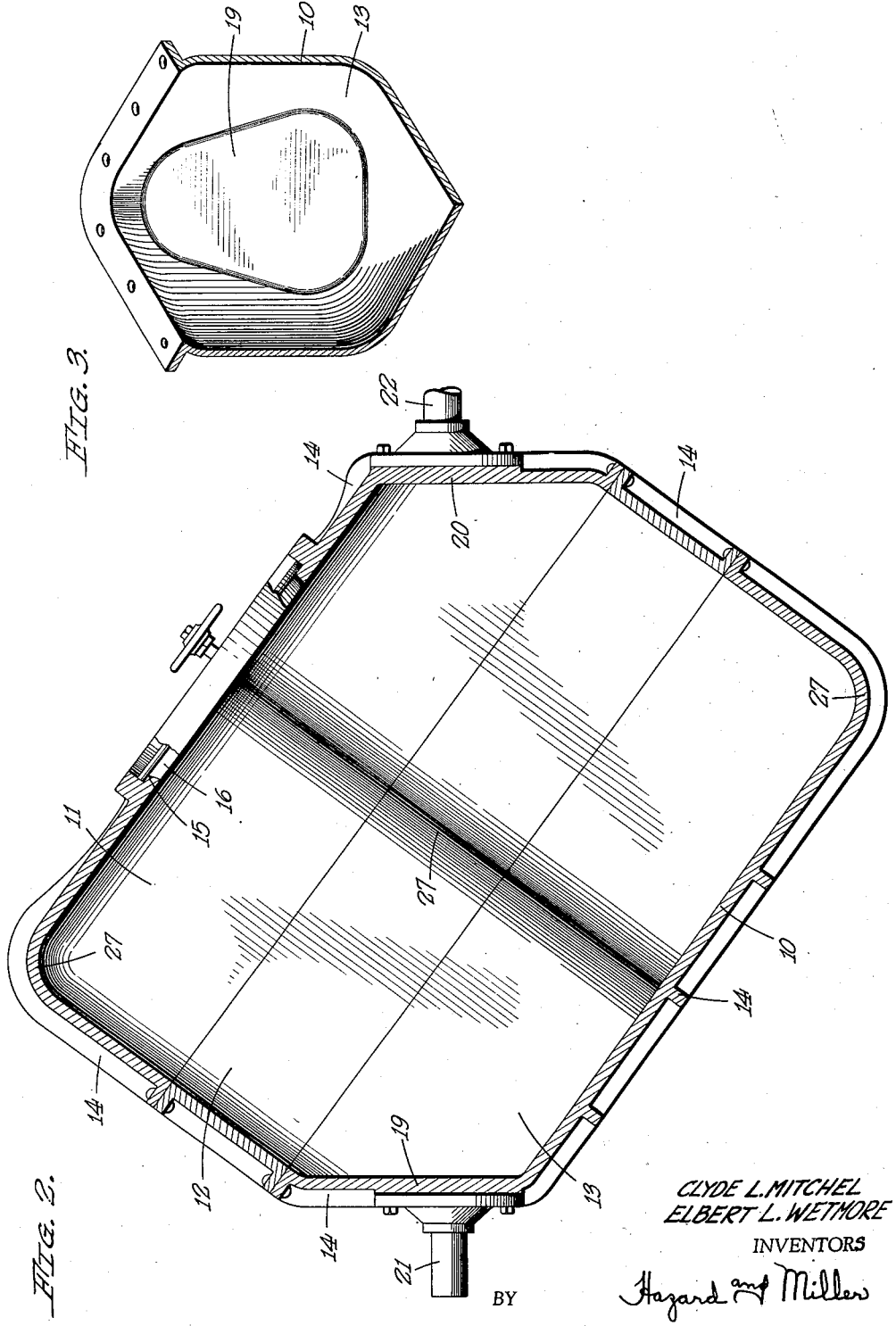

Patented May 14, 1940

2,200,513

UNITED STATES PATENT OFFICE 2,200,513

PROCESS OF CHURNING AND WORKING BUTTER

Clyde L. Mitchel, El Monte, and Elbert L. Wetmore, Alhambra, Calif., assignors to Challenge Cream & Butter Association, Los Angeles, Calif., a corporation of California Substituted for abandoned application Serial No. 749,775, October 24, 1934. This application July 15, 1937, Serial No. 153,708

15 Claims. (Cl. 31—89)

This invention relates to a method of conditioning and working butter and also to a method of churning and subsequently working the butter obtained from the churning process. It may be considered as a substitute application for our copending application Serial No. 749,775, filed October 24, 1934.

In the production of butter the cream is first churned obtaining the butter in a mass of individual granules usually floating in the buttermilk. The buttermilk is then withdrawn from the churn and an amount of wash water approximately equal to the withdrawn buttermilk is introduced to wash the butter granules. This wash water is then withdrawn from the churn and the butter is then in condition for working. The fundamental purpose of working butter is to completely dissolve, uniformly distribute, and properly incorporate the salt to accomplish as complete as possible a fusion between brine and water in butter in the case of salted butter, and in the case of unsalted as well as salted butter, to bring the granules of butter together into a compact mass for convenient handling and packing. Incidentally, the working process further serves to expel buttermilk and to control the moisture content of the butter. The working process in the present development of the art in commercial practice where fairly large amounts of butter are churned and worked at one time, is accomplished in what are called combined churns and butter workers. In such devices the cream is first churned and the butter either removed from the churn and placed in a separate butter worker or the butter is worked within the churning receptacle.

In the majority of combined churns and butter workers wherein the butter is worked within the same receptacle as that in which it is churned, rollers or similar working devices are either introduced into the churning receptacle or are permanently installed therein. Attendant to the methods of working butter in the churning receptacle by means of working apparatus either temporarily or permanently installed therein are several difficulties. If the worker is overloaded as is often the case with combined churns and butter workers heretofore generally used, all of the butter therein is not subjected to uniform treatment with the result that the butter obtained is non-uniform with respect to composition, the degree of working, color, or salt content. The butter is divided into several masses and in the operation of the combined churn and butter worker, during the working process, there is either no opportunity at all or an insufficient opportunity to permit of a complete intermingling and mixture of these individual masses with the result that under ordinary operation it is virtually impossible to secure uniformity in all of the butter worked.

Combined churns and butter workers heretofore used frequently are installed with a definite slope from one end toward the other which, during the working period, is apt to cause the butter located at the lower end to have a greater percentage of moisture than the butter at the upper end. In such devices insofar as we are aware, there is no provision made for the interchange of butter from the lower end to the upper end. However, with the ordinary combined churn and butter worker this slope is practically a necessary evil since some slope is required in order to secure positive and rapid drainage of the buttermilk and wash water. With combined churns and butter workers so installed it is necessary for the operator in adding the salt, to take special precaution in proportioning and distributing the salt among the different masses of butter and throughout the length of the combined churn and butter worker in order to secure reasonable uniformity.

With the use of rollers or other working devices which are pivotally mounted within the churn receptacle or through the walls thereof there are additional objections. The packing glands through which the roller mountings are driven are often a source of cream or butter contamination. The joints between the component parts of the rollers are also potential and also often actual sources of contamination. As the shelves or rollers, as the case may be, are universally constructed of wood which is porous in nature, they are frequently difficult to sterilize. Also, there is frequent danger of splintering or breakage through excessive wear or strain or from the sterilizing treatment. The rollers often spring or warp and frequently get out of alinement with each other or with the walls of the churn, thus causing variations in their action upon different parts of the mass of butter passing between them.

In such type of construction the amount of butter that can be churned and worked during one operation is confined between relatively narrow limits in any given churn and butter worker because the amount of butter present has a decided influence on the efficiency of the butter working mechanism.

The present method has for its object the conditioning and working of the butter in the same receptacle as that in which the butter was churned, handling the butter in a single, unitary mass without the use of temporarily or permanently installed rollers, shelves, or equivalent apparatus. In this way the dangers of contamination, splintering, breakage, and warpage are entirely eliminated. At the same time as the entire mass of butter is handled in one large mass, a uniform distribution of salt, moisture, and coloring when used, is obtained.

More specifically, an object of the present invention is to provide a method wherein the cream may be first churned in a receptacle, the buttermilk withdrawn rapidly and efficiently by reason of the shape of the receptacle, the wash water introduced, and likewise withdrawn rapidly and efficiently, and the butter worked in a single mass by rotating the same receptacle so as to bring about a lifting and percussive dropping of the large mass in the receptacle which is devoid of any internal mechanism such as rollers, shelves, and the like.

The above-outlined method is made feasible by discovery set forth in our copending application Serial No. 736,544, filed July 23, 1934, that cast metal presents surfaces capable of retaining a moisture film even under butter working conditions that will prevent the butter, during the working, from sticking to the walls of the receptacle. The cast metal used should be incapable under normal conditions of imparting a bad flavor to the butter.

As set forth therein, cast aluminum and cast tin and alloys of these metals wherein the aluminum and tin predominate are suitable. A suitable alloy that we advantageously employ is aluminum containing about 5% silicon. Another suitable alloy is aluminum containing about 2% magnesium, but the silicon alloy is preferred by reason of its being somewhat easier to cast into the desired shape.

With the foregoing and other objects in view, which will be made manifest in the following detailed description and specifically pointed out in the appended claims, reference is had to the accompanying drawings for an illustrative embodiment of the invention; wherein:

Figure 1 is a front view in perspective of the preferred form of combined churn and butter worker which may be advantageously employed to perform the process of the present invention;

Fig. 2 is a diametrical section through the combined churn and butter worker illustrated in Fig. 1, the container being illustrated as having been rotated through 90° from the position shown in Fig. 1;

Fig. 3 is a partial view illustrating the interior of one of the corners of the receptacle; and Figs. 4 and 5 are diagrammatic views serving to illustrate diametrically the action taken by the butter in the receptacle during the working operation.

Referring to the accompanying drawings wherein similar reference characters designate similar parts throughout, the combined churn and butter worker illustrated is in the form of a prismatic container preferably box-like and approximately cubical. The walls of the container indicated at 10 are preferably formed of cast aluminum alloy containing about 5% silicon, although any other metal which will not, under ordinary or normal conditions, affect the flavor of the butter even in the presence of salt may be used provided that it is cast. The use of cast metal as distinguished from rolled, drawn, or forged metal is important in that cast metal has a sufficiently porous surface so as to retain a water film during the working operation that will prevent the butter from sticking to the walls of the container.

The container shown is illustrated as being made up of three main body parts illustrated at 11, 12, and 13, which may be externally ribbed as at 14 for purposes of strength. In one of the walls of the container there is a door opening 15 which is normally closed by a door 16. A suitable peepglass 17 may be mounted in one of the walls of the container or may be mounted in the door 16. In one of the corners of the container there is a suitable valve 18 which can be opened to allow the insertion of a suitable strainer (not shown) enabling the drawing off of the buttermilk and wash water. The container 10 is mounted for rotation about a horizontal axis extending through diagonally opposite corners. To this end the diagonally opposite corners are flattened as indicated at 19 and 20 and trunnions 21 and 22 attached thereto which are rotatable in bearings 23 and 24 on suitable supports 25 and 26. As clearly shown in Fig. 2, the remaining corners and intersections of the walls of the container are rounded as indicated at 27. This is done not only for the purpose of facilitating the cleaning of the churn but to form large rounded corners and intersections that will effectively prevent the butter from sticking therein during the working process.

The combined churn and butter worker is driven such as by an electric motor 28 through a suitable speed-change transmission which may be governed by means of a handwheel 29. The purpose of such speed-change transmission is to enable the container to be rotated at a higher speed during the churning operation than during the working operation. In combined churn and butter workers that we have constructed and operated we find when the container is of approximately 5 feet width dimensions on a side capable of handling in excess of 2,000 pounds of cream per churning operation, that the churn should be rotated at approximately 36 R. P. M. During the working operation the churn should be rotated at a slower speed, to wit, at approximately 26 R. P. M. which is the optimum speed producing the maximum percussive drop of the mass of butter during the working.

Having the apparatus as above-described, the process of churning and working the butter is briefly as follows: The cream is introduced into the container 10 at the proper churning temperature for the type of cream to be churned. This temperature depends upon various conditions familiar to buttermakers. The container is then rotated at the churning speed of 36 R. P. M. until the churning operation is completed which is ascertained through the peepglass 17. When this is completed the butter granules preferably are of approximately the size of a pea. The valve 18 is then opened and a strainer inserted and the buttermilk drained out of the receptacle, the strainer serving to retain therein the butter granules. During this draining operation the receptacle is rotated into the position wherein the valve 18 is disposed at or very near the bottom. Being located at a corner of the receptacle all adjacent walls are relatively steep so that draining of the buttermilk is accomplished rapidly and efficiently. When the buttermilk is withdrawn wash water approximately equal in amount to the amount of the withdrawn buttermilk is introduced into the receptacle and the valve is closed. Thereafter, the receptacle is given a few additional revolutions so as to effectively wash the butter granules. The wash water is then withdrawn and the butter granules in the receptacle are then in a condition for working.

A sample of the butter is then tested in the laboratory for its moisture and salt content and additional water is then introduced into the receptacle which, when worked into the butter, will cause the butter to have the desired butter fat and moisture content. In most creameries today the object is to secure butter having slightly more than 80% butter fat content, the remainder being moisture and curd in the case of unsalted butter, and in the case of salted butter the remainder being moisture, curd, and salt.

The buttermaker on ascertaining the moisture content of the butter at the end of the churning operation adds sufficient water to bring about the desired moisture content and the salt. If the butter requires the addition of any coloring matter this is added to the cream before churning. It is not necessary to trench the water or salt in the butter in the churn, nor need any other efforts be made to attempt to effect an even distribution of the water or salt. When the water and salt are added to the receptacle it is then closed and rotated at the working speed of rotation, namely 26 R.P.M. The free moisture in the receptacle forms a water film on the cast metal wall surfaces which is retained regardless of the percussive action of the butter mass and prevents the butter from sticking during the working.

We have illustrated diagrammatically in Figs. 4 and 5 the nature of the action obtained on the butter during the working operation. During this operation the major portion of the mass is lifted by the walls of the container while it rotates. It thereafter slides off of the walls and drops with considerable force to whichever side of the container is lowermost.

During the rotation, corners most adjacent bearing 24 will at times be lowermost and during the intervening times corners of the container nearest bearing 23 will be lowermost, consequently the butter mass as it is picked up by the rotating walls and dropped is not only handled in one unitary mass and rolled over to some extent on itself, but in addition, as the butter mass slides toward the lowermost corner as indicated in Figs. 4 and 5, it is shifted back and forth in the container between the trunnions. This rolling over of the mass and its shifting back and forth brings about a thoroughly uniform incorporation of salt and moisture.

The working operation is continued until practically all of the free moisture is worked into or emulsified with the butter fat. The working operation is stopped just before all of the free moisture has been incorporated into the butter. Thus, in a combined churn and butter worker, as above described, capable of handling in excess of 2,000 pounds of cream per churning and producing in excess of 900 pounds of butter at the end of the working operation, the working is continued until only about one pint of free moisture remains in the container which has not been incorporated in or emulsified with the butter fat. It is important to stop the working operation before all of the free moisture is incorporated so that the free moisture present will continue to form or preserve the necessary water film on the walls of the container that will prevent the butter from sticking. When the working operation is thus completed, the container may be opened, the butter removed, and suitably packaged or stored.

It will be noted that in the above-described process that the interior of the receptacle 10 is unobstructed and that it contains no shelves or rollers. The working of the butter is accomplished entirely by a lifting and dropping of the entire mass of butter during the rotation of the container, the butter at all times being handled therein in one unitary mass.

The butter obtained at the end of the working operation is remarkably dry in appearance, that is it is not mushy or salvy but instead, is one uniform, solid, plastic mass. As the water film is retained on the cast metal walls the receptacle will be observed to be remarkably clean, that is, there are no spots of butter adhering to the walls or in the corners or in the intersections.

It will be appreciated that the method of conditioning butter is not necessarily restricted to the use of particular designs of churns and materials although those above described are highly preferred. While shelves or other internal devices may be employed they are preferably omitted. Other changes may be made without departing from the spirit or scope of the invention as defined by the appended claims provided that the butter is subjected to substantially the same treatment.

We claim:

1. The method of conditioning or working butter which includes having the butter in a box-like container, the walls of which are formed of a cast metal incapable of affecting the flavor of the butter under normal conditions and which are capable of retaining a water film to prevent the butter from sticking thereto, adding water to the butter to be incorporated therein and to form the water film on the walls of the container, and rotating the container about a horizontal axis extending through diagonally opposite corners of the container until substantially all of the water is incorporated in the butter.

2. The method of conditioning or working butter which includes having the butter in a box-like container, the walls of which are capable of retaining a water film to prevent the butter from sticking thereto, adding water to the butter to be incorporated therein and to form the water film on the walls of the container, and rotating the container about a horizontal axis extending through diagonally opposite corners of the container until substantially all of the water is incorporated in the butter, whereby the butter is handled as a single unitary mass which is shifted back and forth endwise of the container while being lifted and dropped by the rotating container.

3. The method of conditioning or working butter which includes having the butter in a prismatic container, the walls of which are formed of a cast metal incapable of affecting the flavor of the butter under normal conditions and which are capable of retaining a water film to prevent the butter from sticking thereto, adding water to the butter to be incorporated therein and to form a water film on the walls of the container, and rotating the container about an axis such that first one corner adjacent one end of the container will be lowermost and then a succeeding corner adjacent the other end of the container will be lowermost until substantially all of the water is incorporated in the butter.

4. The method of conditioning or working butter which includes having the butter in a prismatic container, the walls of which are formed of a cast metal incapable of affecting the flavor of the butter under normal conditions and which are capable of retaining a water film to prevent the butter from sticking thereto, adding water to the butter to be incorporated therein and to form a water film on the walls of the container, and rotating the container about an axis such that first one corner adjacent one end of the container will be lowermost and then a succeeding corner adjacent the other end of the container will be lowermost until substantially all of the water is incorporated in the butter, whereby the butter is handled as a unitary mass which is shifted back and forth endwise of the container while being lifted and dropped by the rotating container.

5. The method of churning and working butter which comprises placing the cream to be churned in a box-like container, the walls of which are formed of a cast metal incapable of affecting the flavor of the butter under normal conditions and which are capable of retaining a water film to prevent the butter sticking thereto, rotating the container at a churning speed to churn the cream, withdrawing the buttermilk, adding wash water, rotating the container to wash the butter, withdrawing the wash water, adding water to the butter to be incorporated therein and to form a water film on the walls of the container, and rotating the container about an axis extending through diagonally opposite corners of the container and at a slower working speed until substantially all of the water is incorporated in the butter, whereby the butter is handled as a unitary mass which is shifted back and forth endwise of the container while being lifted and dropped by the rotating container.

6. The method of churning and working butter which comprises placing the cream to be churned in a box-like container, the walls of which are formed of a cast metal incapable of affecting the flavor of the butter under normal conditions and which are capable of retaining a water film to prevent the butter sticking thereto, rotating the container at a churning speed to churn the cream, withdrawing the buttermilk, adding wash water, rotating the container to wash the butter, withdrawing the wash water, adding water to the butter to be incorporated therein and to form a water film on the walls of the container, and rotating the container about an axis that will cause corners of the container adjacent the ends of the container to be alternately lowermost, whereby the butter is handled as a unitary mass which is shifted back and forth endwise of the container while being lifted and dropped by the rotating container.

7. The method of incorporating moisture into butter in the production of butter which includes adding moisture to the butter and successively impacting the mass percussively against cast metal surfaces incapable under normal conditions of detrimentally affecting the flavor of the butter.

8. The method of working butter which consists in having the butter in the container wherein it was churned and washed, adding moisture for ultimate composition of the butter, and rotating the container at such speed as will cause the mass to be successively picked up and dropped as a unitary mass.

9. The method of working butter which consists in having the butter in the container wherein it was churned and washed, adding moisture for ultimate composition of the butter, and rotating the container at such speed as will cause the mass to be successively picked up and dropped as a unitary mass until almost all of the added moisture has been incorporated in the butter.

10. The method of working butter which consists in having the butter in the container wherein it was churned and washed, adding moisture for ultimate composition of the butter, and rotating the container and causing the mass to be percussively impacted as a unit against the walls of the container.

11. The method of working butter which consists in having the butter in the container wherein it was churned and washed, adding moisture for ultimate composition of the butter, rotating the container and causing the mass to be percussively impacted as a unit against the walls of the container and to be shifted back and forth endwise of the container during its rotation.

12. The method of churning and working butter which comprises placing the cream to be churned in a closed container, the walls of which are formed of a cast metal incapable of affecting the flavor of butter under normal conditions, rotating the container until the butter is churned, drawing off the buttermilk, introducing wash water, drawing off the wash water, introducing salt and water to be incorporated into the butter, and rotating the container at a slower speed than that employed in the churning until the salt is uniformly distributed through the butter and substantially all of the water is incorporated in the butter.

13. The method of working butter which includes having the butter in a closed container, the walls of which are formed of cast metal incapable of affecting the flavor of the butter under normal conditions, adding salt to the butter and water to be incorporated into the butter, and rotating the container until the salt is uniformly distributed in the butter and substantially all of the water is incorporated therein.

14. The method of working butter which includes successively impacting the butter against a wet surface of cast metal incapable of affecting the flavor of the butter under normal conditions until the desired moisture and salt are incorporated and evenly distributed therein.

15. The method of working butter which includes successively picking up and dropping the butter as a single unitary mass against wet rotating surfaces of cast metal, which surfaces are variously inclined, the cast metal being incapable of affecting the flavor of the butter under normal conditions.

CLYDE L. MITCHEL.
ELBERT L. WETMORE.